United States Patent [19]
White, Jr.

[11] Patent Number: 5,213,343
[45] Date of Patent: May 25, 1993

[54] SHAFT SEAL WITH SUPPORT MEMBER AND BACKING RING

[75] Inventor: Hollis N. White, Jr., Hopkinsville, Ky.

[73] Assignee: White Hydraulics, Inc., Hopkinsville, Ky.

[21] Appl. No.: 847,850

[22] Filed: Mar. 9, 1992

Related U.S. Application Data

[63] Continuation of Ser. No. 305,376, Feb. 1, 1989, abandoned, which is a continuation-in-part of Ser. No. 217,307, Jul. 11, 1988, abandoned.

[51] Int. Cl.[5] .............................................. F16J 15/32
[52] U.S. Cl. ...................................... 277/152; 277/153; 277/174; 277/188 A; 277/205; 384/607
[58] Field of Search ................. 277/35, 152, 153, 174, 277/188 R, 193, 205; 384/124, 140, 147, 148, 161, 452, 455, 484, 607; 418/61.3, 104

[56] References Cited

U.S. PATENT DOCUMENTS

| | | | |
|---|---|---|---|
| 2,227,771 | 1/1941 | Victor et al. | 277/47 |
| 2,873,153 | 2/1958 | Haynie | 277/153 |
| 3,254,898 | 6/1966 | Herbenar et al. | 277/47 |
| 3,275,331 | 9/1966 | Mastrobattista et al. | 277/152 |
| 3,300,225 | 1/1967 | Shepler | 277/188 R |
| 3,362,720 | 1/1968 | Henry et al. | 277/188 R |
| 3,477,731 | 11/1969 | Workman | 277/188 R |
| 3,495,843 | 2/1970 | Andersen et al. | 277/176 X |
| 3,540,745 | 11/1970 | Flock | 277/188 A |
| 3,549,445 | 12/1970 | McMahon | 277/35 X |
| 3,614,183 | 10/1971 | Berens | 277/153 X |
| 3,785,661 | 1/1974 | White, Jr. | 277/188 R |
| 4,171,938 | 10/1979 | Pahl | 418/61.3 |
| 4,300,778 | 11/1981 | Gagne | 277/153 |
| 4,365,817 | 12/1982 | Davis | 277/188 R |
| 4,448,426 | 5/1984 | Jackowski et al. | 277/37 |
| 4,491,332 | 1/1985 | Zumbusch | 277/152 |
| 4,514,152 | 4/1985 | Takamatsu et al. | 418/61.3 |
| 4,522,411 | 6/1985 | Burgan | 277/153 |
| 4,552,519 | 11/1985 | White, Jr. | 418/61.3 |
| 4,623,153 | 11/1986 | Nagasawa | 277/153 |
| 4,660,839 | 4/1987 | Mitumaru | 277/153 |
| 4,747,605 | 5/1988 | Antonini | 277/188 A X |
| 4,755,115 | 7/1988 | Akaike | 277/153 X |

FOREIGN PATENT DOCUMENTS

| | | | |
|---|---|---|---|
| 3725808 | 2/1988 | Fed. Rep. of Germany | 277/205 |
| 2102084 | 1/1983 | United Kingdom | 277/152 |

Primary Examiner—William A. Cuchlinski, Jr.
Assistant Examiner—Scott W. Cummings
Attorney, Agent, or Firm—Woodling, Krost & Rust

[57] ABSTRACT

A seal having a steel backing ring closely surrounding a shaft supporting a seal through a teflon intermediate member, the seal itself having a generally "L" shaped steel backup plate next to the intermediate member.

54 Claims, 4 Drawing Sheets

SHAFT SEAL WITH SUPPORT MEMBER AND BACKING RING

FIELD OF THE INVENTION

This is a continuation of copending application Ser. No. 07/305,376 filed on Feb. 1, 1989, now abandoned.

This invention relates to an improved seal for hydraulic or pneumatic devices.

BACKGROUND OF THE INVENTION

Seals have been utilized for years in hydraulic and pneumatic devices to prevent the pressurized fluid in the devices from migrating between sections within the device and between the device and the environment. These seals include the shaft seals for rotating shafts protruding from the device so as to allow a rotary input/output without leakage. These shaft seals are typically a circular ring of the resilient material (normally rubber or a synthetic polymer) surrounding the rotating shaft. However the resilient material frequently can not stand against the pressure exerted upon it; the sideload against a shaft seal frequently is many thousands of pounds at the 1000-2000 PSI typically used within the devices. Therefore a backup ring of some nature is normally included with the shaft seal to reinforce the shaft seal. The backup rings themselves, however, are critical components subject to wear, binding, abrasion, and other problems. Rulons are also used to strengthen the seal. One common Rulon is an "L" shaped Teflon Rulon cast into the material of the seal (after first etching the back side of the Rulon for adherence). This Rulon, however, is difficult to manufacture and is also subject to flex differentiation breakdown, wear and other problems.

OBJECTS OF THE INVENTION

It is an object of this invention to provide a useful shaft seal.

It is an object of this invention to improved the longevity of shaft seals.

It is an object of this invention to lower the total cost of shaft seals.

It is an object of this invention to increase the reliability of shaft seals.

Other objects and a more complete understanding of the invention may be had by referring to the following drawings in which:

DRAWINGS

DESCRIPTION OF THE PREFERRED EMBODIMENT

Figure 1:
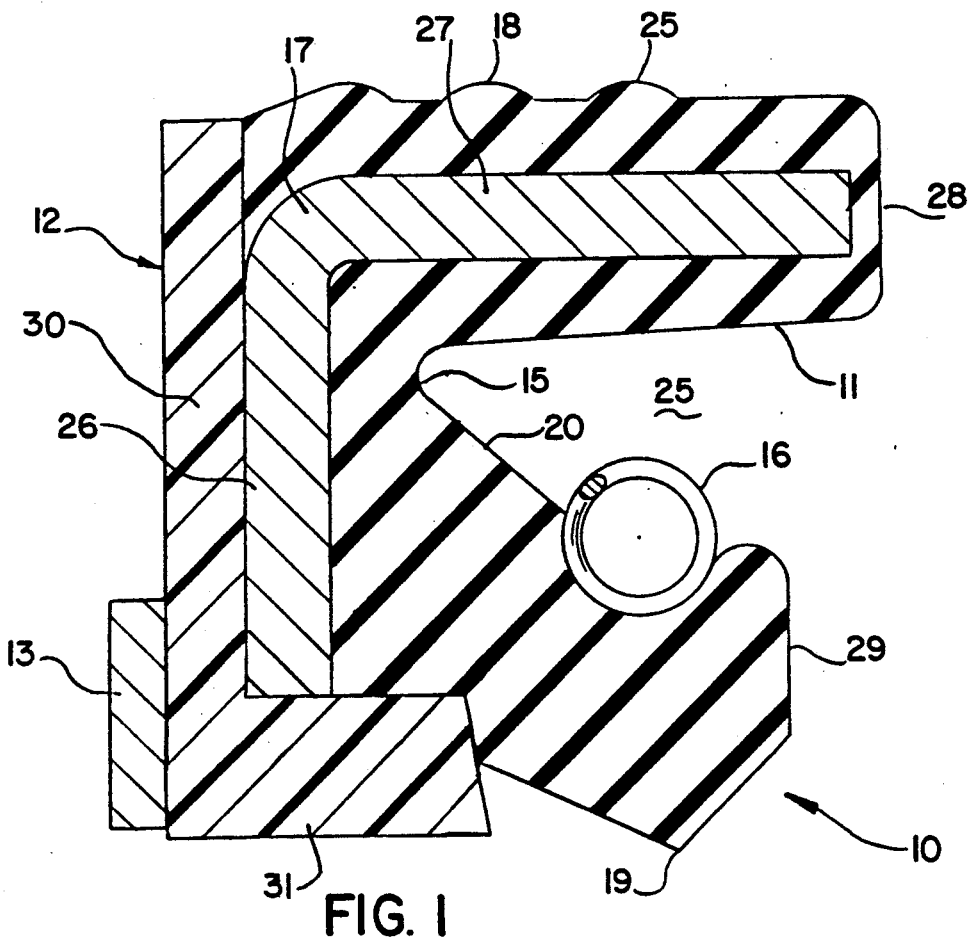
FIG. 1 is a cross-sectional view of a shaft seal incorporating the invention of the application.

This application is a continuation-in-part of U.S. patent application Ser. No. 217,307 filed Jul. 11, 1988, now abandoned. The invention of this application is directed towards an improved shaft seal 10. The shaft seal 10 includes a seal member 11, and intermediate member 12 and a backup ring 13.

The seal member 11 is the primary seal. The preferred seal member 11 includes a resilient body section 15, an optional reinforcing spring 16 and backing plate 17.

The resilient body section 15 of the seal member 11 is made of some sort of resilient material such as rubber or a synthetic polymer. The preferred embodiment is injected molded of Viton (TM Dupont) plastic.

The outer surface 18 of the seal member 11 performs a sealing function against the surrounding device, in the embodiment shown the inner surface of a seal carrier 110. It is preferred that the outer surface 18 be circumferentially ridged so as to produce a series of discrete sealing contacts with the inner surface of the device. This series contact provides a better seal than a single flat seal. The series contact also facilitates sealing by compensating for misalignments, minor bumps, high points, and other deviances from a perfect circle present in either or both of the seal and device. In addition the series contact provides a resiliency to surrounding surface allowing for some sort of radial movement between the seal member 11 and body. This movement facilitates the sealing function of the seal edge 19 by creating an additional location for radial motion of the seal member 11. It is preferred that the outer lip 28 of the outer surface 18 extend a short distance beyond the edge steel of the seal carrier 110 such that the resilient material of the seal must be compressed (0.020 preferred) before a solid contact occurs. This provides a cushion for the bearing 120. Note that this lip 28 in the preferred embodiment is substantially centered in respect to the bearing 120. This insures that the forces are centered on the bearing.

The inner surface 19 of the seal member 11 performs a sealing function against the other part of the device, in the embodiment disclosed a rotary shaft 111. It is preferred that the inner surface 19 be an edge so as to produce a single sealing contact with a rotating shaft such as that shown. This single contact produces less friction and wear than a more numerous number of contacts. In addition the singular contact allows for some sort of movement/alignment between the seal member 11 and shaft 111. Other shapes and/or contacts are possible if necessary or desired. The outer lip 29 of the inner edge 19 of the seal member 11 is recessed in respect to the outer lip 28 of the outer surface 18. This recess 0.040 preferred) insures that most of the axial load on the seal member 11 through the relatively stationary (and reinforced) outer surface 18. This allows the inner edge 19 to float irrespective of axial loads on the seal. The reinforcing spring 16 of the embodiment of FIG. 1 facilitates the functioning of the inner edge 19 of the seal member 11 by creating a resilient circular shape for the absorption/transference of the forces on/from the inner edge 19 of the seal member 11.

The central section 20 of the seal member 11 seals the space between the outer surface 18 and inner edge 19. One part 25 of the central section 20 is cutaway so as to facilitate a floating movement of the inner edge 19 of the seal member 11.

The backing plate 17 is an "L" shaped member located within the resilient body section 15 of the seal member 11. The inward extending portion 26 of the backing plate 17 is exposed to the radial surface of the seal member 11 adjacent to the central section 20 of the seal member 11. This location insures a flat, well supported contact plane for the backing plate 17 (i.e. no resilient material between the backing plate 17 and the solid surface of the neighboring device). This is preferred. The other portion 27 of the backing plate 17 extends under the outer surface 18 of the seal member 11. This other portion 27 supports the outer surface 18 of the seal member 11 against the surrounding seal carrier 110. Since the inward extending portion 26 of the backing plate 17 is relatively lengthy, the outer tip 28 of the outer surface 18 of the seal member 11 is held in solid even contact with the surrounding device. The other portion 27 also strengthens the seal member 11 and intermediate member is as later described.

The intermediate member 12 is located between the seal member 11 and the axial portion 105 of the seal carrier 110 and also between the seal member 11 and the backup ring 13. The intermediate member 12 transfers the axial forces between the seal member 11 and these members. The outwardly extending radial edge 30 of the intermediate member 12 provides a bed for the seal member 11 (including the inward extending portion 26 of the backing plate 17). The outward radial edge 30 also, being trapped between the seal member 11 and carrier 110, holds the intermediate member 12 in place against rotary and other forces. The other portion 27 of the backing plate 17 strengthens the seal member 11 and intermediate member 12 by absorbing most of the inward forces on the intermediate member 12 and seal member 11, especially as their critical lower inner joint. Without this absorption the member would have an increased tendency to extrude inwardly, deforming up to and including into a damaging contact with the shaft 111. In the preferred embodiment described the other portion 27 of the backing plate 17 reduces the inward forces on these members from about 2000 PSI to 700PSI. This reduction in force allows one to design in tighter tolerances for longer lasting devices while reducing the possibility that the members will damagingly deform into contact with the shaft 111. (If a member does damagingly deform into a rotating shaft such member will have an increased tendency to rotate with the shaft, a tendency leading to its subsequent destruction if non-uniform or of significant pressure. This is an especially important consideration in respect to the seal 11 and the inner edge of the intermediate member 12 - the end of the flange 31.) The inwardly extending flange 31 of the intermediate member 12 transfers the axial forces between the inner edge 19 of the seal member 11 and the backup ring 13. This aids in the support of the seal member 11. The outer diameter of the intermediate member 12 is substantially equal to the outer diameter of the seal member 11 when in its use position. The flange 31 is dimensioned to extend inwardly of the seal member 11 into contact with the inner edge 19 of the seal member 11. This aids in the support of the critical section.

The preferred intermediate member 12 is constructed of a material having a hardness lower than the shaft with which the seal 10 is going to be utilized, preferably a hardness slightly lower than the shaft but significantly more than the seal 11. With this hardness the intermediate member 12 will be sacrificed in respect to the shaft while at the same time providing significant support for the seal 11. An example of such a material is Tetralon 902 (a Teflon material including 25% woolsenite—a calcium metacilitate itself 48% calcium oxide, 49% silicon dioxide, 1% $Fe_2O_3$, 1% AlO, 0.1%$O_2$ and 0.05%MgO). This material has a hardness lower than the shaft (i.e. lower than a typical RC 58 hardness for example) and much greater than the rubber seal 11. The Tetralon 902 also provides the proper compressibility and strength for the intermediate member 12. Other materials could also be used. The difference in hardness insures that the intermediate member 12 would be sacrificed and not the more difficult and expensive to replace shaft 111. Also the lower hardness residue of wear would be less likely to damage the other parts of the device than would shaft residue. With this the intermediate member 12 provides a greater support for the seal member 11 than is otherwise possible (Since most of the seal 11 is supported by the intermediate member 12, the seal 11 will not extrude as much into the rotating shaft 111 as much as it otherwise would).

The inner diameter of the flange 31 of the intermediate member 12 is preferably the same as the outer diameter of the shaft 111 (FIG. 1). With this diameter the flange 31 would be relatively immovable upon the application and maintenance of a significant pressure (i.e. the flange 31 would be relatively impervious to extrusion). With this diameter the flange 31 provides a significant and reliable support for the inner edge 19 of the seal 11 while seating well against the shaft 111. The fact that the flange 31 does contact the shaft 111 is accepted as a price for these attributes (i.e. the increase in seal longevity etc. is worth the friction losses etc.). With the flange 31 having such a diameter the effect of high pressure on the seal 10 would be a slight malformation of the inner edge 19 of the seal 10, and this malformation would be limited by the physical presence of the flange 31: the other dimensions of the seal 10 would be relatively stable.

Figure 2:
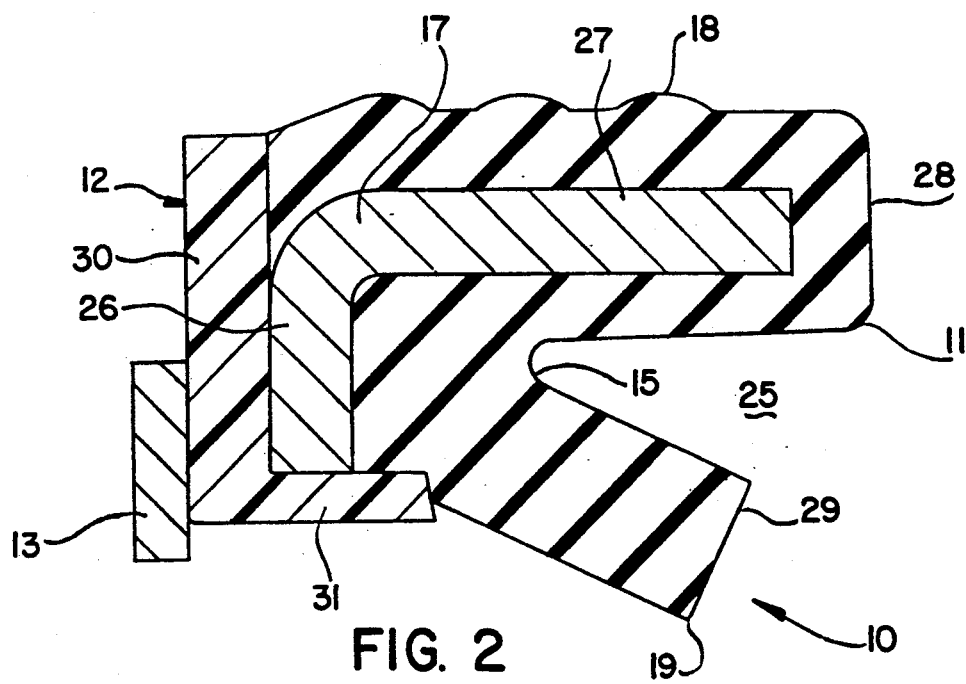
FIG. 2 is a cross-sectional view of an alternate shaft seal incorporating a variation of the invention of the application.
Figure 3:
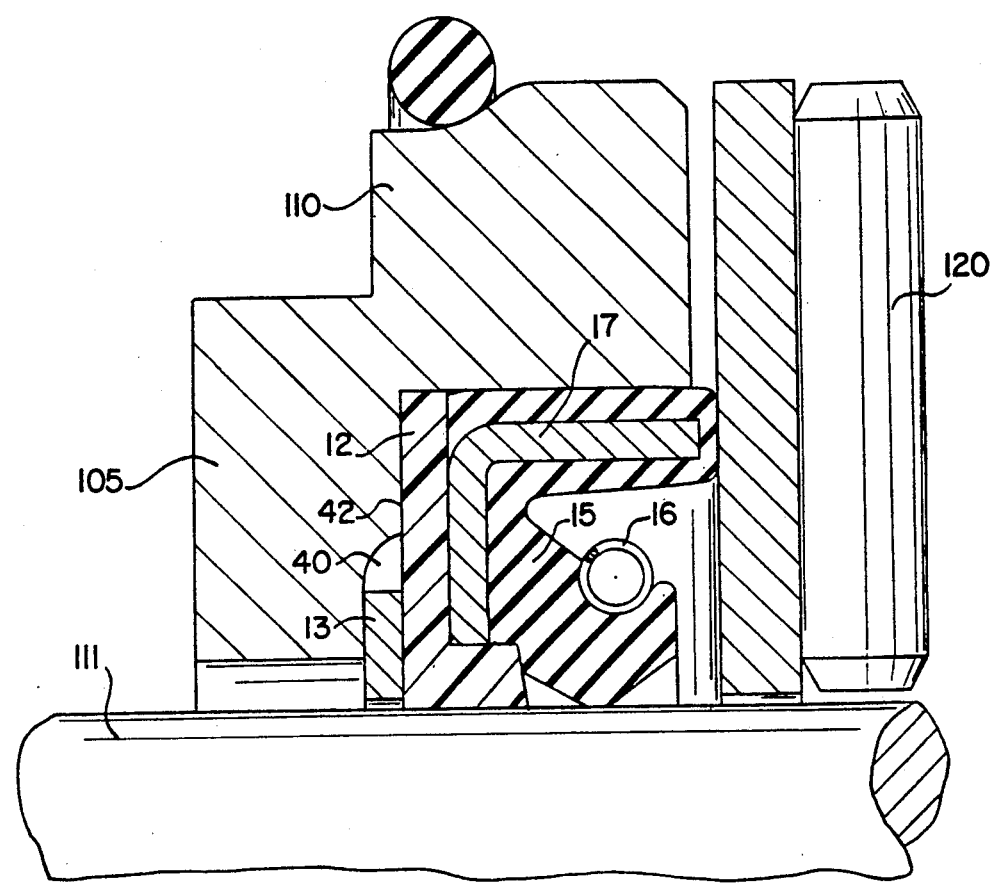
FIG. 3 is a cross-sectional view of the shaft seal of FIG. 1 incorporated into a hydraulic device.
Figure 4:
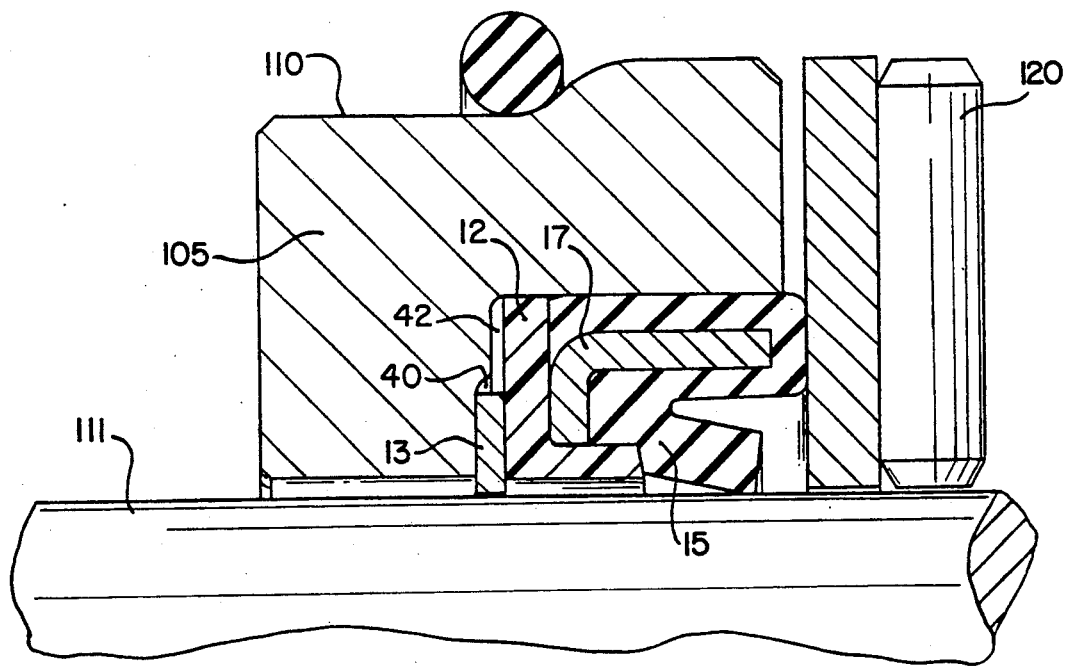
FIG. 4 is a cross-sectional view of the shaft seal on FIG. 2 incorporated into a hydraulic device.
Figure 5:
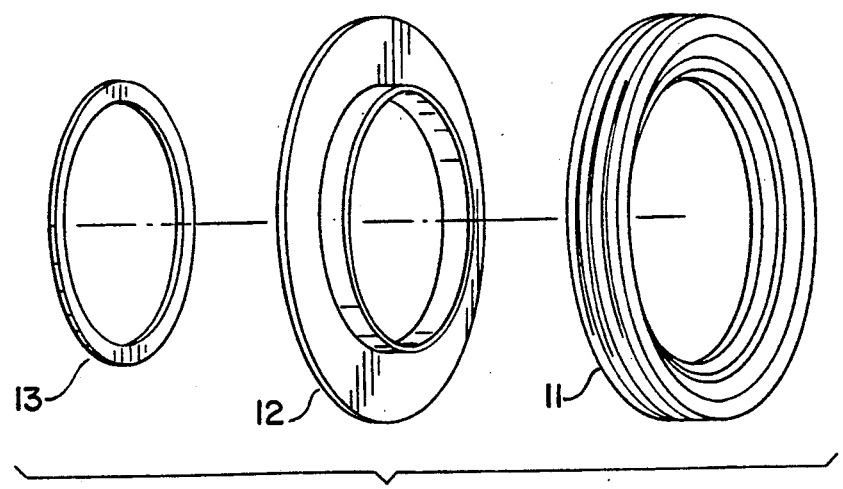
FIG. 5 is an expanded perspective view of the three parts of the seal of FIG. 1.
Figure 6:
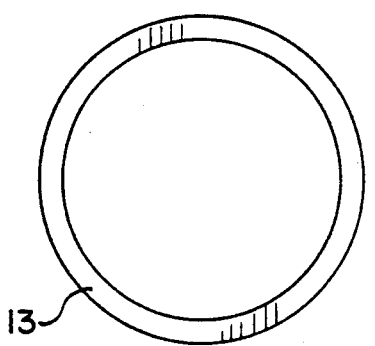
FIG. 6 is an end view of the backup ring of the seal of FIG. 1.
Figure 7:
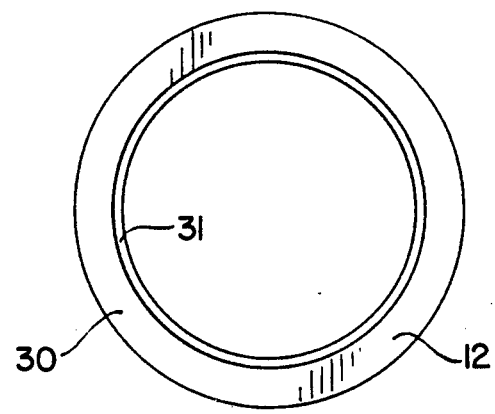
FIG. 7 is an end view of the intermediate member of the seal of FIG. 1.
Figure 8:
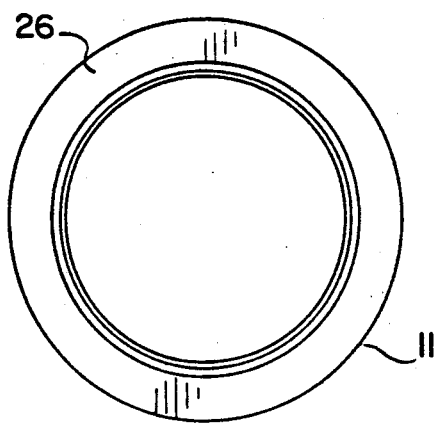
FIGS. 8 & 9 are two opposing end views of the shaft seal of FIG. 1.
Figure 9:
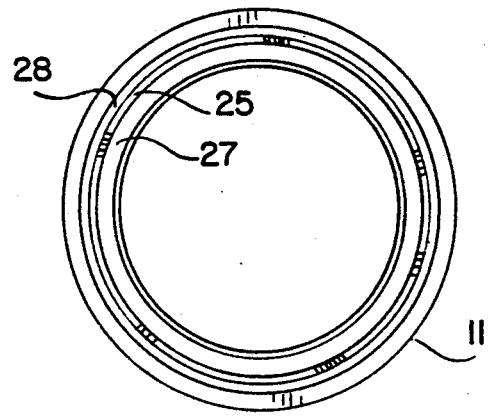
Figure 10:
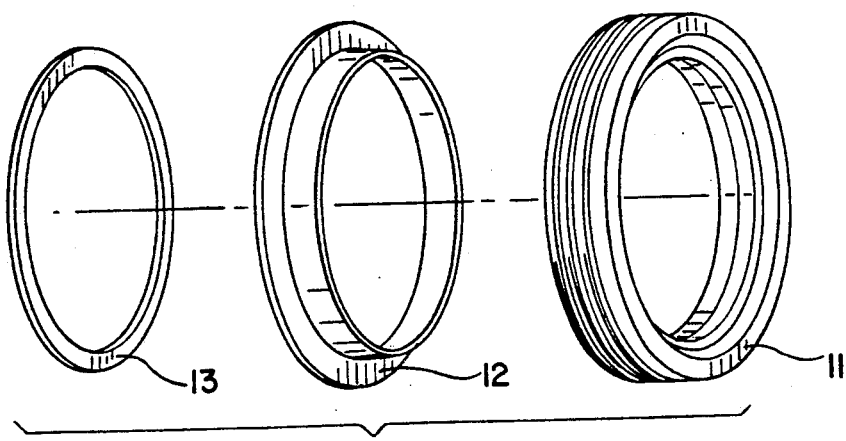
FIGS. 10 is an expanded perspective view of the three parts of the seal of FIG. 2.
Figure 11:
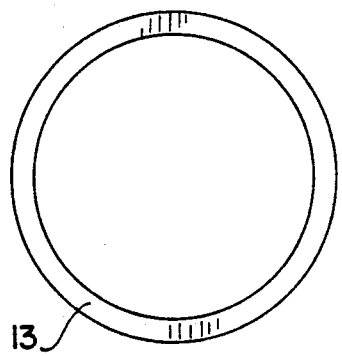
FIG. 11 is an end view of the backup ring of the seal of FIG. 2.
Figure 12:
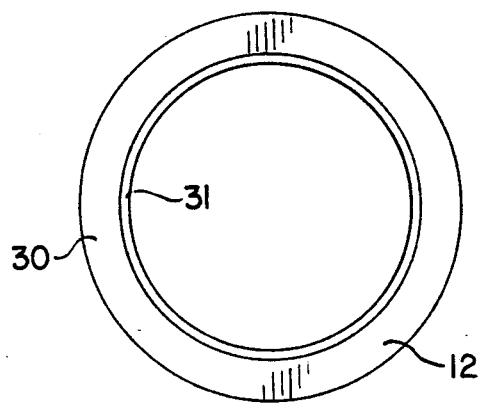
FIG. 12 is an end view of the intermediate member of the seal of FIG. 2.
Figure 13:
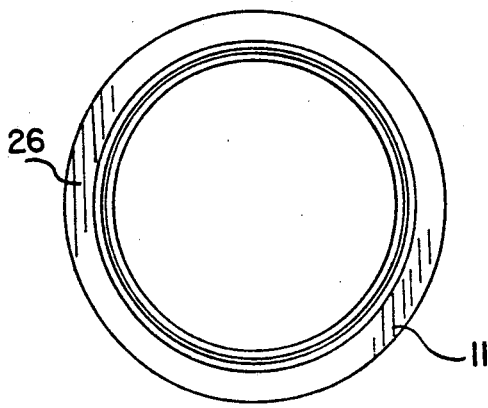
FIG. 13 & 14 are two opposing end views of the shaft seal of FIG. 2.
Figure 14:
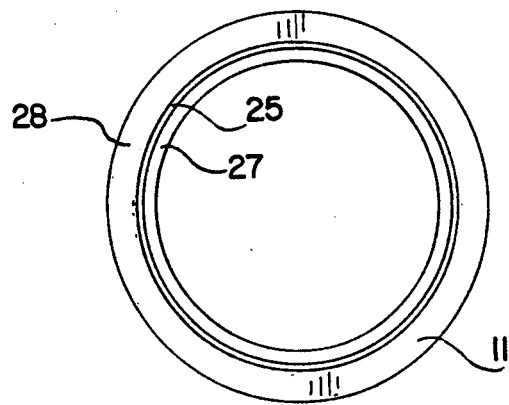

In the device of FIG. 2 the inner diameter of the flange 31 is initially greater than the outer diameter of the shaft 111; the flange 31 is designed to avoid shaft 111—intermediate member 12 contact upon installation and to limit such contact during use. A harder substance such as Teflon with a 25% fiberglass reinforcing could therefore be utilized than in the preferred embodiment of FIG. 1 (recognizing of course that the RC 64 of a typical piece of fiberglass is other than preferable). This harder substance would strengthen the intermediate member at the risk of possible increased damage on breakdown and/or increased malformation of the seal 11 on the application of significant pressure: a risk worth taking in certain types of applications (i.e. very high pressure where the added strength is desired). (The parts of any seal will extrude eventually. With a harder intermediate member 12 this extrusion will occur at a higher pressure than otherwise. This in combination with the spacing from the shaft of the inner diameter of the intermediate member 12 of FIG. 2 lowers the inward forces between these members and the shaft 111.)

The backing ring 13 is designed to provide an axial support for the inner edge 19 of the seal member 11. The preferred backing ring 13 is a thin steel ring having an inner diameter slightly greater than the shaft 111 and an outer diameter a little more than the diameter of the inner edge of the inward extending portion 26 of the backing plate 17. The backing ring 13 itself is axially trapped in a cavity 41 in the surface 42 of the device axially adjoining the intermediate member 11. The intermediate member 12 allows the backing ring 13 to radially float relative to the seal member 11 while still providing the axial support for such seal member 11. To insure that the backing ring 13 can float the part of the device immediately outward of the backing ring 13 is relieved 40. This relieved section 40 allows the backing ring to radially float to align itself to the shaft 111. It is preferred that the inner diameter of the backing ring be only a few thousands larger than the diameter of the shaft 111. This insures the maximum support for the inner edge 19 of the seal member 11. The intermediate member 12 thus allows this backing ring 13 to float relative to the seal member 11 while still providing the axial support for such seal 11.

Although this invention has been described in its preferred form with a certain degree of particularity, it is to be understood that numerous changes may be made without departing from the invention as hereinafter claimed.

What is claimed is:

1. An improved seal for a shaft in a device having an immovable radial surface, the shaft having a diameter, the improved seal comprising a body, said body providing a sealing contact between the device and the shaft, a backing ring, means to limit the axial movement of said backing ring in respect to the device, an intermediate member, said intermediate member being fixedly located between said body of said seal and said backing ring and between said seal and at least part of the immovable radial surface of the device, said backing ring having an inner diameter, said inner diameter of said backing ring being greater than the diameter of the shaft, said intermediate member having inner diameter and said diameter of said intermediate member being greater than said inner diameter of said backing ring.

2. An improved seal for a shaft in a device with the seal adjacent to a radial surface of the device the improved seal comprising a body, said body having a radial side and an inner edge, said inner edge providing a sealing contact with the shaft, a backing ring, means to limit the axial movement of said backing ring in respect to the device, an intermediate member, said intermediate member having two sections, one sections of said intermediate member being fixedly located immediately adjacent to said radial side of said body of said seal and immediately adjacent to the radial surface of the device, the other section of said intermediate member being located between said inner edge of said body of said seal and said backing ring, said one section and said other section of said intermediate member having axial lengths and said axial length of said other section of said intermediate member being greater than said axial length of said one section of said intermediate member.

3. The improved seal of claim 2 wherein the shaft has a hardness and characterized in that said intermediate member has a hardness less than the hardness of the shaft.

4. An improved seal for a shaft in a device with the seal adjacent to a radial surface of the device, the improved seal comprising a body, said body having a radial side and an inner edge, said inner edge providing a sealing contact with the shaft, a backing ring, means to limit the axial movement of said backing ring in respect to the device, an intermediate member, said intermediate member having two sections, one section of said intermediate member being fixedly located between said radial side of said body of said seal and the radial surface of the device, the other section of said intermediate member being located between said inner edge of said body of said seal and said backing ring, said one section and said other section of said intermediate member having axial lengths, said axial length of said other section of said intermediate member being greater than said axial length of said one section of said intermediate member, and said backing ring being recessed into a cavity in the radial surface of the device.

5. The improved seal of claim 4 characterized in the said backing ring has an outer diameter and said cavity in the radial surface of the device has an inner diameter with said inner diameter of said cavity being greater than said outer diameter of said backing ring.

6. The improved seal of claim 4 characterized in that said backing ring has a radial surface and said radial surface of said backing ring being substantially in line with the radial surface of the device so as to present a planar surface to said intermediate member.

7. An improved seal for a shaft in a device with the seal adjacent to a radial surface of the device, the improved seal comprising a body, said body having a radial side and an inner edge, said inner edge providing a sealing contact with the shaft, a backing ring, means to limit the axial movement of said backing ring in respect to the device, an intermediate member, said intermediate member having two sections, one section of said intermediate member being fixedly located between said radial side of said body of said seal and the radial surface of the device, the other section of said intermediate member being located between said inner edge of said body of said seals and said backing ring, said one section and said other section of said intermediate member having axial lengths, said axial length of said other section of said intermediate member being greater than said axial length of said one section of said intermediate member, the shaft having a diameter, said backing ring having an inner diameter, said inner diameter of said backing ring being greater than the diameter of the shaft, said intermediate member having inner diameter and said diameter of said intermediate member being greater than said inner diameter of said backing ring.

8. An improved seal for a shaft in a device with the seal adjacent to a radial surface of the device, the shaft having a diameter, the improved seal comprising a body, said body having a radial side and an inner edge, said inner edge providing a sealing contact with the shaft, a backing ring, said backing ring having a diameter, said diameter of said backing ring being greater than the diameter of the shaft, means to limit the axial movement of said backing ring in respect to the device, an intermediate member, said intermediate member having two sections, one section of said intermediate member being located immovably immediately adjacent to said radial side of said body of said seal and immediately adjacent to the radial surface of the device, the other section of said intermediate member being located between said inner edge of said body of said seal and said backing ring, said one section of said other section of said intermediate member having axial lengths, said axial length of said other section of said intermediate member being greater than said axial length of said one section of said intermediate member, said other section of said intermediate member having an inner diameter, and said inner diameter of said intermediate member being equal to the diameter of the shaft.

9. The improved seal of claim 8 wherein the shaft has a hardness and characterized in that said intermediate member has a hardness less than the hardness of the shaft.

10. An improved seal for a shaft in a device with the seal adjacent to a radial surface of the device, the shaft having a diameter, the improved seal comprising a body, said body having a radial side and an inner edge, said inner edge providing a sealing contact with the shaft, a backing ring, said backing ring having a diameter, said diameter of said backing ring being greater than the diameter of the shaft, means to limit the axial movement of said backing ring in respect to the device, an intermediate member, said intermediate member having two sections, one section of said intermediate member being located immovably between said radial side of said body of said seal and the radial surface of the device, the other section of said intermediate member being located between said inner edge of said body of said seal and said backing ring, said one section and said other section of said intermediate member having axial lengths, said axial length of said other section of said intermediate member being greater than said axial length of said one section of said intermediate member, said other section of said intermediate member having an inner diameter, said inner diameter of said intermediate member being equal to the diameter of the shaft, and said backing ring being recessed into a cavity in the radial surface of the device.

11. The improved seal of claim 10 characterized in the said backing ring has an outer diameter and said cavity in the radial surface of the device has an inner diameter with said inner diameter of said cavity being greater than said outer diameter of said backing ring.

12. The improved seal of claim 10 characterized in that said backing ring has a radial surface and said radial surface of said backing ring being substantially in line with the radial surface of the device so as to prevent a planar surface to said intermediate member.

13. An improved seal for a shaft having an outer diameter in a device having an immovable radially extending surface, the improved seal comprising a body, said body providing a sealing contact between the device and the shaft, a backing ring, said backing ring having an inner diameter, said inner diameter of said backing ring being substantially equal to said outer diameter of the shaft, said backing ring being located on the shaft, means to limit the axial movement of said backing ring in respect to the device, an intermediate member, said intermediate member being fixedly located between said body of the seal and said backing ring and between immediately adjacent to said body of the seal and and immediately adjacent to at least part of the immovable radially extending surface of the device.

14. The improved seal of claim 13 wherein the shaft has a hardness and characterized in that said intermediate member has a hardness, and said hardness of said intermediate member being less than the hardness of the shaft.

15. The improved seal of claim 13 characterized by the addition of a backing plate, and said backing plate being encapsulated by the seal.

16. The improved seal of claim 15 characterized in that said backing plate has a radially extending portion and another portion and said radially extending portion extending substantially radially of the shaft.

17. The improved seal of claim 16 characterized in that said radially extending portion of said backing plate is exposed to the surface of said body of the seal adjacent to said intermediate member.

18. The improved seal of claim 13 characterized in that said intermediate member has an outer diameter, said body of the seal has an outer diameter, and said outer diameter of said intermediate member being substantially equal to said outer diameter of said body of the seal.

19. The improved seal of claim 13 characterized in that said intermediate member is fixedly located between said body of the seal and all of said backing ring.

20. The improves seal of claim 13 characterized in that said intermediate member is fixedly located between said body of the seal and all of the immovable radially extending surface of the device.

21. An improved seal for a shaft having an outer diameter in a device having an immovable radially extending surface, the improved seal comprising a body, said body providing a sealing contact between the device and the shaft, a backing ring, said backing ring having an inner diameter, said inner diameter of said backing ring being substantially equal to said outer diameter of the shaft, said backing ring being located on the shaft, means to limit the axial movement of said backing ring in respect to the device, an intermediate member, said intermediate member being fixedly located between said body of the seal and said backing ring and between said body of the seal and at least part of the immovable axial surface of the device, a cavity, said cavity being located in the axial surface of the device, said backing ring being located in said cavity, said backing ring having axial thickness, said cavity having a depth and said axial thickness of said backing ring being substantially equal to said depth of said cavity.

22. An improved seal for a shaft having an outer diameter in a device having an immovable axial surface, the improved seal comprising a body, said body providing a sealing contact between the device and the shaft, a backing ring, said backing ring having an inner diameter, said inner diameter of said backing ring being substantially equal to said outer diameter of the shaft, said backing ring being located on the shaft, said backing ring being located next to the immovable axial surface of the device, an intermediate member, said intermediate member having an inner diameter, said inner diameter of said intermediate member being substantially equal to the outer diameter of the shaft, said intermediate member being fixedly located immediately adjacent to said body of the seal and said backing ring and immediately adjacent to said body of the seal and at least part of the immovable axial surface of the device, and said inner diameter of said intermediate member being in contact with the shaft.

23. The improved seal of claim 22 wherein the shaft has a hardness and characterized in that said intermediate member has a hardness, and said hardness of said intermediate member being less than the hardness of the shaft.

24. The improved seal of claim 22 characterized by the addition of a backing plate, said backing plate having a radially extending portion and another portion, said backing plate being encapsulated by said body of the seal with said radially extending portion being located extending substantially radially of the shaft and said another portion extending substantially axially of the shaft.

25. The improved seal of claim 24 characterized in that said radially extending portion of said backing plate is exposed to the surface of said body of the seal adjacent to said intermediate member.

26. The improved seal of claim 24 wherein said backing ring has an outer diameter, said radially extending portion of said backing plate has an inner diameter, and said outer diameter of said backing ring is greater than said inner diameter of said radially extending portion of said backing plate.

27. The improved seal of claim 25 wherein said backing ring has an outer diameter, said radially extending portion of said backing plate has an inner diameter, and said outer diameter of said backing ring is greater than said inner diameter of said radially extending portion of said backing plate.

28. The improved seal of claim 22 characterized in that said intermediate member has an outer diameter, said body of the seal has an outer diameter, and said outer diameter of said intermediate member being substantially equal to said outer diameter of said body of the seal.

29. The improved seal of claim 22 characterized in that said intermediate member is fixedly located between said body of the seal and all of said backing ring.

30. The improved seal of claim 22 characterized in that said intermediate member is fixedly located between said body of the seal and all of the immovable radially extending surface of the device.

31. An improved seal for a shaft extending having an outer diameter in a device having an immovable radially surface, the improved seal comprising a body, said body providing a sealing contact between the device and the shaft, a backing ring, said backing ring having an inner diameter, said inner diameter of said backing ring being substantially equal to said outer diameter of the shaft, said bearing ring being located on the shaft, said backing ring being located next to the immovable axial surface of the device, an intermediate member, said intermediate member having an inner diameter, said inner diameter of said intermediate member being substantially equal to the outer diameter of the shaft, said intermediate member being fixedly located between said body of the seal and said backing ring and between said body of the seal and at least part of the immovable radially extending surface of the device, said inner diameter of said intermediate member being in contact with the shaft, a cavity, said cavity being located in the axial surface of the device, said backing ring being located in said cavity, said backing ring having axial thickness, said cavity having a depth and said axial thickness of said backing ring being substantially equal to said depth of said cavity.

32. An improved seal for a shaft having an outer diameter in a device having an immovable radially extending surface, an improved seal comprising a body, said body providing a sealing contact between the device and the shaft, a backing ring, said backing ring having an inner diameter, said inner diameter of said baking ring being substantially equal to said outer diameter of the shaft, said backing ring being located on the shaft, said backing ring being located next to the immovable axial surface of the device, a backing plate, said backing plate having a radially extending portion and another portion, said backing plate being located in said body of the seal with said radially extending portion extending substantially radially of the shaft, an intermediate member, said intermediate member having an inner diameter, said inner diameter of said intermediate member being substantially equal to the outer diameter of the shaft, said intermediate member being fixedly located axially of said body of the seal immediately adjacent to said body of the seal and said backing ring and immediately adjacent to said body of the seal and at least part of the immovable radially extending surface of the device, and said radially extending portion of said backing plate being exposed to the surface of said body of the seal adjacent to said intermediate member.

33. The improved seal of claim 32 characterized in that said intermediate member has an outer diameter, and said body of the seal has an outer diameter, and said outer diameter of said intermediate member being substantially equal to said outer diameter of said body of the seal.

34. The improved seal of claim 32 wherein said backing ring has an outer diameter, said radially extending portion of said backing plate has an inner diameter, and said outer diameter of said backing ring is greater than said inner diameter of said radially extending portion of said backing plate.

35. An improved seal for a shaft having a diameter in a device having an immovable radial surface, an improved seal comprising a body, said body providing a sealing contact between the device and the shaft, a backing plate, said backing plate having a radially extending portion and another portion, said backing plate being located partially encapsulated by said body of the seal with said radially extending portion being located extending substantially radially of the shaft and said another portion extending substantially axially of the shaft, a cavity, said cavity being in the immovable radial surface of the device, said cavity having an axial extent, a backing ring, said backing ring having an inner diameter, said inner diameter of said backing ring being substantially equal to the diameter of the shaft, said backing ring being located in said cavity in said immovable radial surface of the device, said backing ring having an axial thickness, said axial thickness of said backing ring being substantially equal to said axial extent of said cavity, an intermediate member, said intermediate member having an inner diameter, said inner diameter of said intermediate member being substantially equal to said diameter of the shaft, said intermediate member being fixedly located axially of said body of the seal between said body of the seal and said backing ring and between said body of the seal and at least part of the immovable radial surface of the device.

36. The improved seal of claim 35 characterized in that said radially extending portion of said backing plate is exposed to the surface of said body of the seal adjacent to said intermediate member.

37. The improved seal of claim 35 characterized in that said intermediate member has an outer diameter and said body of the seal has an outer diameter and said outer diameter of said intermediate member being substantially equal to said outer diameter of said body of the seal.

38. An improved seal for a shaft having a diameter in a device having an immovable radial surface, an improved seal comprising a body, said body providing a sealing contact between the device and the shaft, said body having an axial surface extending radially of the shaft, a backing plate, said backing plate having a radially extending portion and another portion, said backing plate being located partially encapsulated by said body of the seal with said radially extending portion being located extending substantially radially of the shaft and said another portion extending substantially axially of the shaft, said another portion being exposed to said axial surface of the seal, a cavity, said cavity being in the immovable radial surface of the device, said cavity having an axial extent, a backing ring, said backing ring having an inner diameter, said inner diameter of said backing ring being substantially equal to the diameter of the shaft, said backing ring being located in said cavity in said immovable axial surface of the device, said backing ring having an axial thickness, said axial thickness of said backing ring being substantially equal to said axial extent of said cavity, an intermediate member, said intermediate member having an inner diameter, said inner diameter of said intermediate member being substantially equal to said diameter of the shaft, said intermediate member being fixedly located axially of said body of the seal between the seal and said backing ring and between said body of the seal including said another portion of said backing plate and immediately adjacent to the immovable radial surface of the device and said intermediate member having a hardness less than the hardness of the shaft.

39. An improved seal for a shaft having an outer diameter in a device having an immovable radial surface and a bore having a diameter, the improved seal comprising a body, said body providing a sealing contact between the device and the shaft, a backing ring, said backing ring having an inner diameter, said inner diameter of said backing ring being substantially equal to said outer diameter of the shaft, said backing ring being located about the shaft, means to limit the axial movement of said backing ring in respect to the device, said backing ring having an outer diameter, said outer diameter of said backing ring being less than the diameter of the bore of the device, an intermediate member, said intermediate member being fixedly located between said body of the seal and said backing ring and between said body of the seal and immediately adjacent to at least part of the immovable radial surface of the device.

40. The improved seal of claim 39 characterized by the addition of a backing plate, and said backing plate being encapsulated in the seal.

41. The improved seal of claim 40 characterized in that said backing plate has a radially extending portion and another portion and said radially extending portion extending substantially radially of the shaft.

42. The improved seal of claim 41 characterized in that said radially extending portion of said backing plate is exposed to the surface of said body of the seal adjacent to said intermediate member.

43. The improved seal of claim 39 characterized in that said intermediate member has an outer diameter, said body of the seal has an outer diameter, and said outer diameter of said intermediate member being substantially equal to said outer diameter of said body of the seal.

44. An improved seal for a shaft having an outer diameter in a device having an immovable radial surface and a bore having a diameter, the improved seal comprising a body, said body providing a sealing contact between the device and the shaft, a backing ring, said backing ring having an inner diameter, said inner diameter of said backing ring being substantially equal to said outer diameter of the shaft, said backing ring being located about the shaft, means to limit the axial movement of said backing ring in respect to the device, said backing ring having an outer diameter, said outer diameter of said backing ring being less than the diameter of the bore of the device, an intermediate member, said intermediate member being fixedly located between said body of the seal and said backing ring and between said body of the seal and at least part of the immovable radial surface of the device, a cavity, said cavity being located in the radial surface of the device, said backing ring being located in said cavity, said backing ring having axial thickness, said cavity having an axial extent and said axial thickness of said backing ring being substantially equal to said axial extent of said cavity.

45. An improved seal of a shaft having an outer diameter in a device having an immovable radial surface and a bore having a diameter, the improved seal comprising a body, said body providing a sealing contact between the device and the shaft, a backing ring, said backing ring having an inner diameter, said inner diameter of said backing ring being substantially equal to said outer diameter of the shaft, said backing ring being located about the shaft, said backing ring being located next to the immovable radial surface of the device, said backing ring having an outer diameter, said outer diameter of said backing ring being less than the diameter of the border of the device, an intermediate member, said intermediate member having an inner diameter, said inner diameter of said intermediate member being substantially equal to the outer diameter of the shaft, said intermediate member being fixedly located between said body of the seal and said backing ring and between said body of the seal and immediately adjacent to at least part of the immovable radial surface of the device, and said inner diameter of said intermediate member being in contact with the shaft.

46. The improved seal of claim 45 characterized by the addition of a backing plate, said backing plate having a radially extending portion and another portion, said backing plate being encapsulated in said body of the seal with said radially extending portion being located extending substantially radially of the shaft and said another portion extending substantially axially of the shaft.

47. The improved seal of claim 46 wherein said backing ring has an outer diameter, said radially extending portion of said backing plate has an inner diameter, and said outer diameter of said backing ring is greater than said dinner diameter of said radially extending portion of said backing plate.

48. The improved seal of claim 46 wherein said backing ring has an outer diameter, said radially extending portion of said backing plate has an inner diameter, and said outer diameter of said backing ring is greater than said dinner diameter of said radially extending portion of said backing plate.

49. An improved seal for a shaft having an outer diameter in a device having an immovable radially extending surface and a bore having a diameter, the improved seal comprising a body, said body providing a sealing contact between the device and the shaft, a backing ring, said backing ring having an inner diameter, said dinner diameter of said backing ring being substantially equal to said outer diameter of the shaft, said backing ring being located about the shaft, said backing ring being located next to the immovable radial surface of the device, said backing ring having an outer diameter, said outer diameter of said backing ring being less than the diameter of the bore of the device, an intermediate member, said intermediate member having an inner diameter, said inner diameter of said intermediate member being substantially equal to the outer diameter of the shaft, said intermediate member being fixedly located between said body of the seal and said backing ring and between said body of the seal and at least part of the immovable radially extending surface of the device, said inner diameter of said intermediate member being in contact with the shaft, a cavity, said cavity being located in the axial surface of the device, said backing ring being located in said cavity, said backing ring having axial thickness, said cavity having an axial extent and said axial thickness of said backing ring being substantially equal to said axial extent of said cavity.

50. An improved seal for a shaft having an outer diameter in a device having an immovable radial surface and a bore having a diameter, an improved seal comprising a body, said body providing a sealing contact between the device and the shaft, a backing ring, said backing ring having an inner diameter, said inner diameter of said backing ring being substantially equal to said outer diameter of the shaft, said backing ring being located about the shaft, said backing ring being located next to the immovable radial surface of the device, said backing ring having an outer diameter, said outer diameter of said backing ring being less than the diameter of the bore of the device, a backing plate, said backing plate having a radially extending portion and another portion, sia backing plate being located encapsulated in said body of the seal with said radially extending portion extending substantially radially of the shaft, an intermediate member, said intermediate member having an inner diameter, said inner diameter of said intermediate member being substantially equal to the outer diameter of the shaft, said intermediate member being fixedly located axially of said body of the seal between said body of the seal and said backing ring and between said body of the seal and immediately adjacent to at least part of the immovable radial surface of the device, and said radially extending portion of said backing plate being exposed to the surface of said body of the seal adjacent to said intermediate member.

51. The improved seal of claim 50 wherein said backing ring has an outer diameter, said radially extending portion of said backing plate has an inner diameter, and said outer diameter of said backing ring is greater than said inner diameter of said radially extending portion of said backing plate.

52. An improved seal for a shaft having a diameter in a device having an immovable radial surface, and improved seal comprising a body, said body providing a seal contact between the device and the shaft, a backing plate, said backing plate having a radially extending portion and another portion, said backing plate being located partially encapsulated by said body of the seal with said radially extending portion being located extending substantially radially of the shaft and said another portion extending substantially axially of the shaft, a cavity, said cavity being in the immovable radial surface of the device, said cavity having an axial extent and a diameter, a backing ring, said backing ring having an inner diameter, said inner diameter of said backing ring being substantially equal to the diameter of the shaft, said backing ring being located in said cavity in said immovable radial surface of the device, said backing ring having an axial thickness, said axial thickness of said backing ring being substantially equal to said axial extent of said cavity, said backing ring having an outer diameter, said outer diameter of said backing ring being less that said diameter of said cavity, an intermediate member, said intermediate member having an inner diameter, said inner diameter of said intermediate member being substantially equal to said diameter of the shaft, said intermediate member being fixedly located axially of said body of the seal between said body of the seal and said backing ring and between said body of the seal and at least part of the immovable radial surface of the device.

53. The improved seal of claim 52 characterized in that said radially extending portion of said backing plate is exposed to the surface of said body of the seal adjacent to said intermediate member.

54. An improved seal for a shaft having a diameter in a device having an immovable radial surface, an improved seal comprising a body, said body providing a sealing contact between the device and the shaft, said body having an axial surface extending radially of the shaft, a backing plate, said backing plate having a radially extending portion and another portion, sia backing plate being located partially encapsulated by said body of the seal with said radially extending portion being located extending substantially radially of the shaft and said another portion extending substantially axially of the shaft, said another portion being exposed to said axial surface of the seal, a cavity, said cavity being in the immovable radial surface of the device, said cavity having an axial extent and a diameter, a backing ring, said backing ring having an inner diameter, said inner diameter of said backing ring being substantially equal to the diameter of the shaft, said backing ring being located in said cavity in said immovable axial surface of the device, said backing ring having an axial thickness, said axial thickness of said backing ring being substantially equal to said axial extent of said cavity, said backing ring having an outer diameter, said outer diameter of said backing ring being less than said diameter of said cavity, an intermediate member, said intermediate member having an inner diameter, said inner diameter of sia intermediate member being substantially equal to said diameter of the shaft, said intermediate member being fixedly located axially of said body of the seal between the seal and said backing ring and between said body of the seal including said another portion of said backing plate and the immovable radial surface of the device and said intermediate member having a hardness less than the hardness of the shaft.

* * * * *